US008700496B2

(12) United States Patent
Poisson

(10) Patent No.: US 8,700,496 B2
(45) Date of Patent: Apr. 15, 2014

(54) GIFT GIVING USING A CUSTOM CATALOG OF GIFTS

(75) Inventor: John Poisson, San Francisco, CA (US)

(73) Assignee: NI Investments, Inc. WA (US)

( * ) Notice: Subject to any disclaimer, the term of this patent is extended or adjusted under 35 U.S.C. 154(b) by 98 days.

(21) Appl. No.: 13/234,939

(22) Filed: Sep. 16, 2011

(65) Prior Publication Data

US 2013/0073421 A1    Mar. 21, 2013

(51) Int. Cl.
*G06Q 30/00* (2012.01)
(52) U.S. Cl.
USPC ....... 705/27.1; 705/26.1; 705/26.5; 705/26.7; 705/14.23; 705/14.53; 705/26.81

(58) Field of Classification Search
USPC ............. 705/26.1, 26.5, 27.1, 26.7, 14.23, 705/14.53, 26.81
See application file for complete search history.

(56) References Cited

U.S. PATENT DOCUMENTS

| | | |
|---|---|---|
| 2008/0172304 A1 | 7/2008 | Berkowitz |
| 2010/0049632 A1 | 2/2010 | Friedman |
| 2011/0047039 A1 | 2/2011 | Crames et al. |
| 2012/0209748 A1* | 8/2012 | Small ........................ 705/27.1 |
| 2012/0245987 A1* | 9/2012 | Isaacson et al. ........... 705/14.23 |

* cited by examiner

*Primary Examiner* — Yogesh C Garg
(74) *Attorney, Agent, or Firm* — Lane Powell, PC

(57) ABSTRACT

Gift giving is disclosed, including: receiving a characteristic of an intended gift recipient and a gift amount; and generating a custom catalog of gifts that includes gift items selected based at least in part on the characteristic and the gift amount.

23 Claims, 12 Drawing Sheets

WANTFUL

▼ Hello, Brian / Explore / Learn More / Support

Upcoming Occasions

If you Create a Gift Today for a Future Occasion, We Can Arrange for that Gift to Arrive Just in Time.

May 2011

| S | M | T | W | T | F | S |
|---|---|---|---|---|---|---|
|   |   |   |   |   |   |   |
|   |   | 10 |   | 12 |   | 14 |
|   |   |   |   |   |   |   |
|   | 23 |   | 25 |   |   |   |
| 29 |   |   |   |   |   |   |

— 252

Taylor's Birthday March 26

John's Birthday April 1

Your Anniversary May 5

Taylor's Birthday March 26
Create Gift — 254
Don't Let Me Forget

John's Birthday April 1

Your Anniversary May 5

Taylor's Birthday March 26

John's Birthday April 1

Your Anniversary May 5 — 256

Add More Occassions

| Name | Occasion | Date |
|------|----------|------|
|      |          |      |
|      |          |      |
|      |          |      |
|      |          |      |

258

Cancel   Save

FIG. 2B

GIFT GIVING USING A CUSTOM CATALOG OF GIFTS

BACKGROUND OF THE INVENTION

Selecting a gift for someone can entail a considerable amount of planning and browsing for a gift giver. For example, a gift giver may need to research what he or she thinks the gift recipient would like and does not already have, and the giver may also spend time to travel to obtain a desirable gift. Sometimes, a gift recipient also spends time to return the gift at the store from which it was purchased and sometimes without success.

To avoid buying a specific gift that a gift recipient may not like or already has, a gift giver can buy a gift card. However, with a store-specific gift card, for example, a gift giver runs the risk that the card is purchased from a store that the gift recipient does not prefer. Also, with the gift card, the gift giver runs the risk of giving a gift that may be perceived to be too impersonal.

A gift giver can access recommendation services and/or websites that suggest possible items based on past, collected information. However, using these recommendation engines also entails the trouble of knowing specific items that the gift recipient prefers so that suggestions based on this knowledge can be made, and even then the giver may not know whether the recipient already has a particular item.

BRIEF DESCRIPTION OF THE DRAWINGS

Various embodiments of the invention are disclosed in the following detailed description and the accompanying drawings.

FIG. 2B shows an example of a user interface at which a user can create an occasion.

DETAILED DESCRIPTION

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

A custom-made catalog of gifts for an intended gift recipient is disclosed. In some embodiments, a set of one or more characteristics regarding the intended gift recipient is received. In some embodiments, a gift amount or value is also received. In some embodiments the one or more characteristics and/or gift amount are selected through a user interface for creating a custom catalog of gifts. In some embodiments, a catalog of gifts is generated based at least in part on the received one or more characteristics and the gift amount. In some embodiments, gifts included in the catalog have values that are (or close to) the received gift amount. In some embodiments, gifts included in the catalog are selected because they relate to the received one or more characteristics. In some embodiments, a gift recipient receives the custom catalog and selects a gift from the catalog and the gift is then delivered or otherwise redeemed on behalf of the gift recipient.

Figure 1:
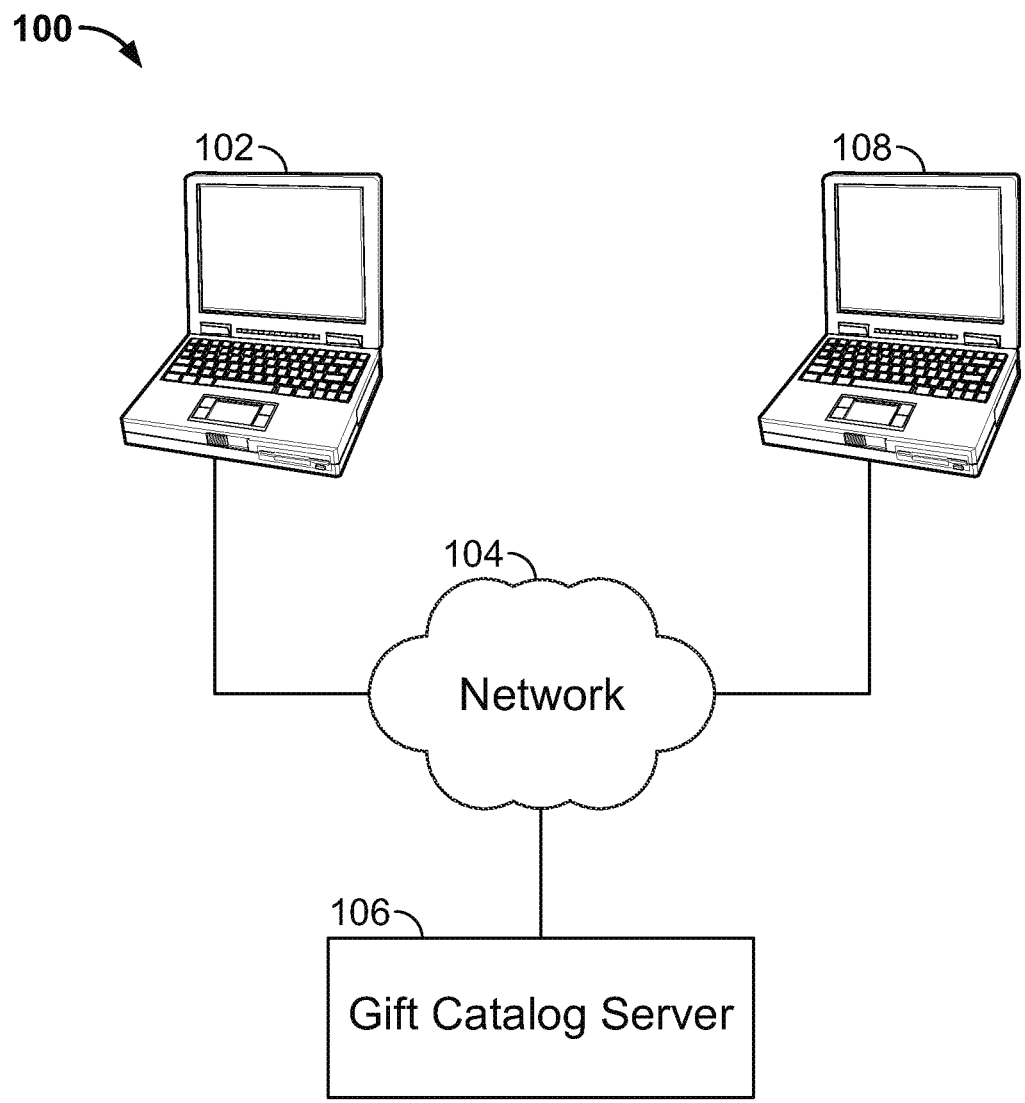
FIG. 1 is a diagram of an embodiment of a system for gift giving using a custom catalog.

FIG. 1 is a diagram of an embodiment of a system for gift giving using a custom catalog. In the example shown, system 100 includes gift giver equipment 102, gift recipient equipment 108, network 104, and gift catalog server 106. In various embodiments, gift giver equipment 102 and gift recipient equipment 108 communicate to gift catalog server 106 via network 104. Network 104 includes various high speed data networks and/or telecommunications networks.

Gift giver equipment 102 communicates to gift catalog server 106 to create a customized gift catalog for an intended gift recipient. While gift giver equipment 102 is shown as a laptop in the example, gift giver equipment 102 can include any computer, mobile device, mobile phone (e.g., an Apple iPhone® or a Google Android® phone) or tablet device, for example. In various embodiments, a user accesses gift giver equipment 102 to communicate to gift catalog server 106 to create a customized gift catalog for an intended gift recipient by interacting with a user interface supported by gift catalog server 106. In some embodiments, the user interface may be accessed by using a web browser (e.g., Google Chrome®, Microsoft Internet Explorer®, Mozilla Firefox®) running on gift giver equipment 102 to direct to a certain web address (e.g., "www.wantful.com"). In some embodiments, a user at gift giver equipment 102 can select, input, enter, and otherwise interact with a user interface designed to receive useful information (e.g., characteristics) and a desired gift amount/ value (e.g., intended cost of the gift), inputted by the user regarding an intended gift recipient. In some embodiments, the user interface to be used by a gift giver dynamically reacts to selections by a user at gift giver equipment 102. In some embodiments, subsequent to making selections at the user interface, gift giver equipment 102 receives potential gift options generated by gift catalog server 106 using the information (e.g., characteristics regarding the intended gift recipient and/or gift value) collected at the user interface. In some embodiments, the user at gift giver equipment 102 can edit the potential gift options (e.g., presented in a catalog contents preview) generated by gift catalog server 106 for the user interface. The confirmed potential gift options are included in a custom catalog of gifts for the intended gift recipient. By using general information about the gift recipient that is provided by a gift giver, several gift options can be generated, thereby saving the gift giver the trouble of having to suggest specific gifts.

Gift catalog server 106 receives information (e.g., characteristics) and a gift value regarding an intended gift recipient (e.g., from gift giver equipment 102). In various embodiments, gift catalog server 106 supports a user interface (e.g., accessible through a web browser) that is designed to collect information (e.g., from a gift giver) regarding an intended gift recipient. For example, this user interface can present a series of questions, options, selections, and other interactive features with which a user (e.g., at gift giver equipment 102) can engage to submit information regarding the intended gift recipient. In some embodiments, the information received through the user interface is stored with gift catalog server 106 or at another location accessible by gift catalog server 106.

In various embodiments, gift catalog server 106 includes an inventory of predetermined gifts and metadata associated with each gift. For example, for each entry of a gift (e.g., identified by an identifier and/or description) at an inventory, the entry may include metadata such as the value (e.g., retail cost, wholesale cost, or some other cost) of the gift, various (predefined) characteristics that relate to the gift, and one or more categories for which the gift has been classified. In some embodiments, using the collected information from a user at gift giver equipment 102, the gift inventory is accessed to find gifts whose metadata match the characteristics and the gift value of the collected information. In some embodiments, the matching gifts are, for example, and presented at the user interface accessible by gift giver equipment 102. In some embodiments, only a subset of all matching gifts (e.g., the 20 top matching gifts) are presented at the user interface for a preview of the potential gifts to be included in the custom catalog. In some embodiments, the user at gift giver equipment 102 can edit and confirm the presented potential gifts at the user interface. In some embodiments, the confirmed gift options are included in the custom catalog of gifts for the intended gift recipient. In some embodiments, the gifts included in the custom catalog are stored at gift catalog server 106. In some embodiments, gift catalog server 106 generates customized designs (e.g., text, images, graphics, photos), additional pages, and formatting to include in the custom catalog of gifts. For example, a catalog that is created for a gift recipient "Brian" may include the text "Happy Birthday Brian!" on the cover of the catalog. In some embodiments, the custom catalog of gifts is sent by gift catalog server 106 to be physically printed on paper and to be bound as a book. In some embodiments, the custom catalog of gifts is sent to the intended gift recipient as one or more of the following: an electronic notification (e.g., email, text message or an alert at a social network website) that includes information needed to access a user interface at which a gift of the catalog may be redeemed, a physical printed version of the custom catalog of gifts, and a digital copy of the custom catalog (e.g., for which a gift recipient may peruse on an electronic device). In some embodiments, regardless of how a custom catalog is accessed by the gift recipient (e.g., whether as a physical book, through a web-accessible user interface, or through a digital file), the gift recipient may experience browsing the catalog (e.g., page by page), as if he or she were looking through a sample of product offerings, offerings that are gift options selected based on information about the gift recipient. For example, the catalog may include a cover page, a personalized introduction, a table of contents listing the available gift options, pages with photos and descriptions of each gift option (e.g., where each gift option is displayed on its own page with an accompanying description), and an end page.

In some embodiments, gift catalog server 106 receives a selection of a gift (e.g., from gift recipient equipment 108) that is included in a custom catalog of gifts. In some embodiments, the user of gift recipient equipment 108 is the intended gift recipient of the custom catalog of gifts. In some embodiments, gift catalog server 106 presents a user interface designed for gift redemption that includes the gifts from the custom catalog of gifts for gift recipient equipment 108. While gift recipient equipment 108 is shown as a laptop in the example, gift recipient equipment 108 can include any computer, mobile device, mobile phone (e.g., such as an Apple iPhone® or a Google Android® phone) or tablet device, for example. In some embodiments, the user interface presented to gift recipient equipment 108 is accessible using a web browser. In some embodiments, the custom catalog of gifts includes an identifier that links the intended gift recipient (e.g., some information that is needed by the intended gift recipient to access) to the user interface tailored for that gift recipient. For example, the custom catalog may include a web address (e.g., a Uniform Resource Locator) that is especially intended for the gift recipient. Once the web address is accessed via a web browser, the gift recipient is taken to a customized landing page that permits him or her to access a web-based user interface related to his custom catalog and/or also permits him to engage in redeeming a gift from the catalog. In another example, the custom catalog gift recipient may include login information (e.g., a login ID and password and/or a gift code) that the gift recipient may use to either create an account at a web-based user interface at a general website (e.g., supported by gift catalog server 106) and/or access a web-based user interface related to his custom catalog and/or engage in redeeming a gift from the catalog. In some embodiments, a user at gift recipient equipment 108 selects (e.g., interacts with the user interface to affect a selection) a gift within the custom catalog of gifts. For example, the user can click on an image and/or a textual/graphical description of a gift to indicate a desire to redeem the gift.

Figure 2A:
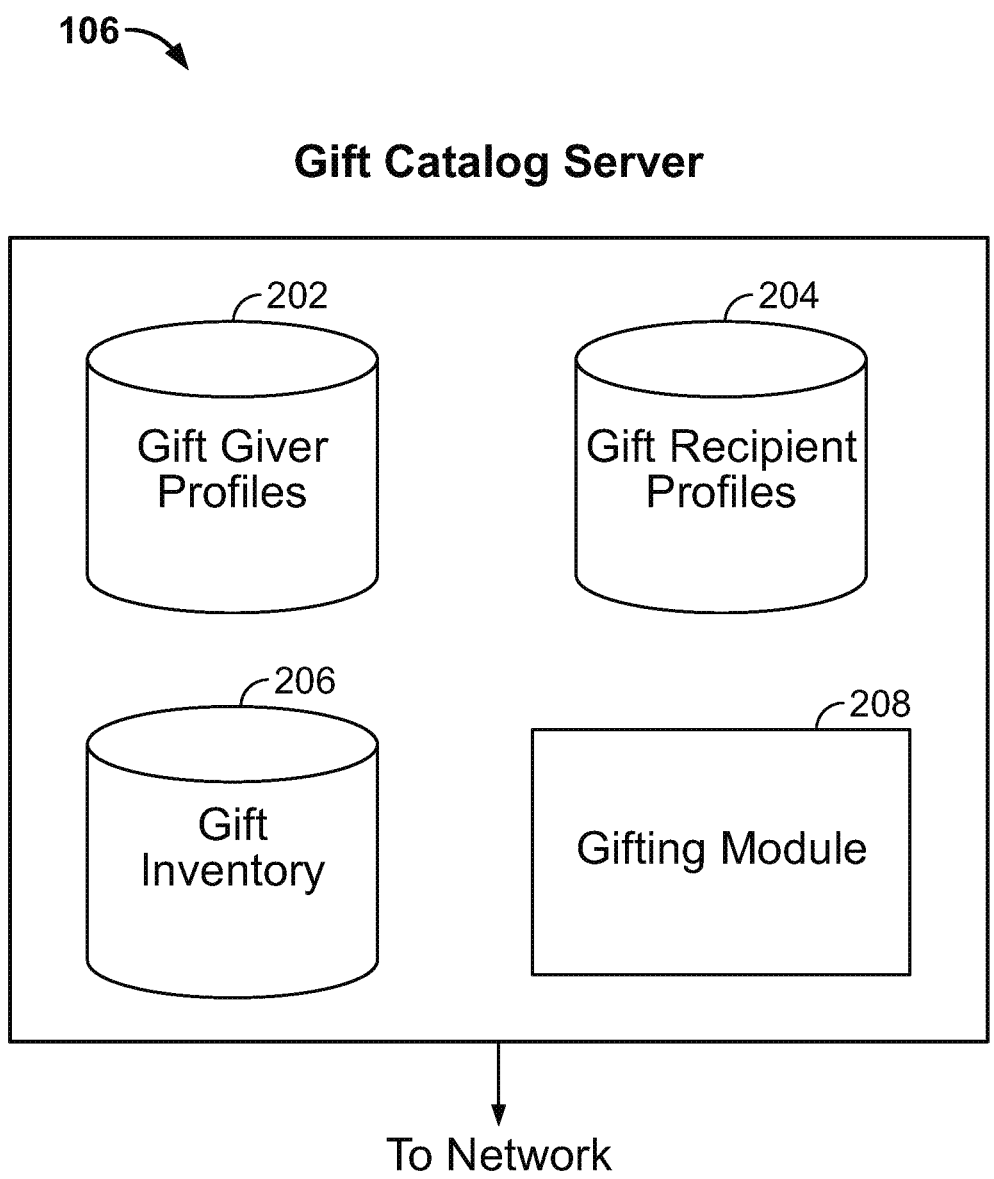
FIG. 2A is a diagram showing an embodiment of a gift catalog server.

FIG. 2A is a diagram showing an embodiment of a gift catalog server. In some embodiments, gift catalog server 106 can be implemented using the example shown. In the example, the gift catalog server includes gift giver profiles 202, gift recipient profiles 204, gift inventory 206, and gifting module 208. In some embodiments, gift giver profiles 202, gift recipient profiles 204, gift inventory 206, and gifting module 208 may be implemented as one or more hardware and/or software components across one or more devices.

Gift giver profiles 202 include information regarding users who sign up to create a custom catalog of gifts for an intended gift recipient. In some embodiments, gift giver profiles 202 are implemented using one or more databases to store tables of information. A profile for a gift giver may include, for example, login information (e.g., user name and password), basic contact information (e.g., name, address, email, and phone number), the gift giver's birthday, financial information (e.g., credit card, bank account, and/or Paypal information), a transaction history, identifiers of one or more intended gift recipients (e.g., of gift recipient profiles 204) for whom the gift giver has historically created a custom catalog of gifts, and data files associated with those historically created custom catalog(s) of gifts. In some embodiments, a profile for a gift giver can also include one or more characteristics regarding the gift giver.

In some embodiments, when a user wishes to create a custom catalog of gifts for the first time, the user can access a user interface (e.g., located at a particular URL, such as "www.wantful.com") presented by gifting module 208. For example, the user interface can present input fields for the user to complete and the collected information can comprise at least a portion of the stored gift giver profile for that gift giver. When the user returns to access the custom catalog service, the user can enter his or her login information (e.g., at a user interface) and in response, gifting module 208 can associate the user with his or her gift giver profile.

In some embodiments, a profile for a gift giver can also include potential gift occasions created/specified by the user that created the profile. For example, the user can designate certain dates and/or events (e.g., at a user interface presented by gifting module 208) as occasions for which the gift giver is interested in creating a custom catalog of gifts for one or more gift recipients. FIG. 2B shows an example of a user interface at which a user can create an occasion. As shown in the example, a user can select date 252 on an interactive calendar. In response to the selection of date 252, an interactive element for creating an occasion on that date, such as occasion designation window 258, can appear and the user can enter in the relevant information of the occasion (e.g., a name for the occasion, one or more gift recipients the gift giver could potentially create custom catalogs of gifts for, and notes regarding the occasion). Information associated with the created occasion could be stored with the gift giver's profile associated with that user. In FIG. 2B, graphical element "Your anniversary" 256 is an example of an occasion created by a user. At the arrival of the user designated occasion, a prompt (e.g., via email, and/or text message) is sent to the user so that the user can create one or more custom catalogs of gifts, if desired.

In some embodiments, a profile for a gift giver can also include an indication to remind the user regarding a particular occasion (e.g., prior to the arrival of that occasion). Examples of the particular occasion can include an occasion that is kept track of by a social network associated with gifting module 208 (e.g., Facebook's birthday events) or an occasion that is created by the user (as described above). For example, the user can designate a particular occasion (e.g., at a user interface presented by gifting module 208) for which a reminder is desired. Returning to the example of FIG. 2B, to set up a reminder for the occasion "Taylor's birthday" on March 26, a user can select the graphical element associated with the occasion (e.g., by waving a cursor over the occasion) and an interactive element such as "Don't let me forget" 254 can appear. By selecting "Don't let me forget" 254, the user can set up a reminder for the occasion of "Taylor's birthday" on March 26. Information regarding a reminder for a particular occasion can be stored with the gift giver's profile associated with the user. In some embodiments, a user can also select one or more features/conditions associated with a reminder for a particular occasion. For example, features/conditions associated with a reminder can include how many days prior to the occasion a reminder should be sent and/or how a reminder is to be sent (e.g., a text message to a phone number, an email, and/or a phone call). Upon the conditions of a reminder being met (e.g., the specified number of days prior to the occasion having arrived), a reminder can be sent to the user (e.g., via a text message to a phone number, an email, and/or a phone call). For example, a notification of the reminder can include information regarding the associated occasion (e.g., "This Friday is Taylor's birthday") and, if appropriate, a prompt to create a custom catalog of gifts for a gift recipient associated with the occasion (e.g., "Would you like to create a custom catalog of gifts for Taylor?") would appear.

Gift recipient profiles 204 include information regarding users who are intended gift recipients for whom custom catalogs of gifts were created by gift givers. In some embodiments, gift recipient profiles 204 are implemented using one or more databases to store tables of information. A profile for a gift giver includes, for example, login information (e.g., user name and password), basic contact information (e.g., name, address, email, and phone number), the gift recipient's birthday, financial information (e.g., credit card, bank account, and/or Paypal information), a transaction history, identifiers (e.g., from gift giver profiles 202) of one or more gift givers from whom the gift recipient has historically received a custom catalog of gifts, and data files associated with those historically received custom catalog(s) of gifts. In various embodiments, a profile for a gift recipient includes the (e.g., predefined) characteristics that have been identified to be associated with the gift recipient. In various embodiments, a profile for a gift recipient includes a list of gifts that have been included in the custom catalog(s) of gifts sent to the gift recipient. In various embodiments, a profile for a gift recipient includes a list of the gifts that the gift recipient has selected for redemption from the custom catalog(s) of gifts sent to the gift recipient. In some embodiments, a profile for a gift recipient can include a reference to a gift giver profile of gift giver profiles 202 so that, for example, characteristics that are associated with the gift giver can be easily identified using the corresponding gift recipient profile of that gift giver.

In some embodiments, information included in a gift recipient profile is provided by one or more gift givers. For example, in the process of a gift giver creating a custom catalog of gifts for the gift recipient, the gift giver provides contact information (e.g., name, email) of the gift recipient and useful information (e.g., hobbies, tastes, fashion sense, living arrangement, lifestyle habits, etc.) of the gift recipient. In some embodiments, a gift recipient's contact information, as provided by a gift giver, is stored within its respective table entries (e.g., name, email) of the gift recipient profile. In some embodiments, useful information as provided by a gift giver is mapped to a set of predefined characteristics (e.g., by gifting module 208) and such predefined characteristics are stored within its respective table entries (e.g., characteristics) of the gift recipient profile.

In some embodiments, information included in a gift recipient profile is provided by the gift recipient himself/herself. For example, once an intended gift recipient receives a custom catalog of gifts, the gift recipient can access a user interface (e.g., located at a particular URL such as "www.wantful.com") presented by gifting module 208 to redeem a gift from the catalog. The gift recipient user can, for example, enter an identifier (e.g., temporary password or gift code) provided in the custom catalog at the user interface to access an experience at the user interface that is tailored for the gift recipient. For example, the tailored user interface may display all the gifts included in the custom catalog. The tailored user interface may also include some input fields that are prepopulated with information provided by the gift giver and other incompleted input fields to be filled out by the gift recipient. At least some of the information entered by the gift recipient can be included in the profile for that gift recipient. In some embodiments, if a gift recipient does not prefer any gift from the catalog, then in the gift redeeming process, the gift recipient can provide further useful information about himself or herself (e.g., at the user interface), which can be mapped to characteristics that are stored with the gift recipient profile.

Gift inventory 206 includes metadata related to gifts. In some embodiments, gift inventory 206 is implemented using one or more databases to store tables of information. In various embodiments, gift inventory 206 includes information on a predetermined selection of gifts. In some embodiments, the gifts are selected by an administrator of the gift catalog server. In some embodiments, the gifts are selected for being of a niche-variety and/or difficult to obtain through conventional means (e.g., going to a department store, ordering through Amazon.com). In some embodiments, gift inventory 206 is updated periodically (e.g., gifts are added or deleted, metadata associated with a gift is updated). In some embodiments, each gift is stored with identifying information and a set of metadata. Examples of identifying information of a gift can include, but is not limited to, one or more of the following: name, manufacturer, supplier, model, stock-keeping unit (SKU), and product number. Examples of information in the set of metadata for a gift can include, but is not limited to, one or more of the following: value (e.g., retail cost, wholesale cost, or some other cost) of the gift, one or more categories (e.g., at one or more granularities such as "alcohol" and "whiskey"), one or more characteristics, and an availability (e.g., whether the gift is currently in stock and/or a quantity of the gift that is in stock) associated with the gift. In some embodiments, a characteristic is a piece of information that relates a gift to an intended gift recipient. For example, for a gift of a "French press," one characteristic can be "interest in coffee" (e.g., or just "coffee") and another characteristic can be "interest in kitchen appliance" (e.g., or just "kitchen appliance"). In some embodiments, gifting module 208 can obtain useful information provided by a gift giver of a gift recipient through a user interface and distill such information into a set of characteristics. In some embodiments, gifting module 208 also obtains a gift amount (e.g., the amount includes the price of the gift and/or any additional costs associated with packaging/shipping/delivery of the gift) from the gift giver through the user interface. Then, for example, gifts inventory 206 is searched for gifts whose metadata (e.g., one or more characteristics and amount) matches to the set of characteristics obtained from the gift giver. At least a subset of the matching gifts is included in a preview of the custom catalog of gifts for the intended gift recipient to be shown to the gift giver at the user interface.

Gifting module 208 is configured to provide the service of customizing a catalog of gifts and/or redeeming a gift from a custom catalog of gifts. In some embodiments, gifting module 208 provides such a service via a web-based application (e.g., which can be accessed at a URL such as "www.wantful.com"). In some embodiments, gifting module 208 supports a user interface at the web-based application. In some embodiments, gifting module 208 can support the creation of user accounts at the user interface such that a returning user need only input identifying information (e.g., login name and password) to have other information related to the user recalled (e.g., using a gift giver profile or gift recipient profile). In some embodiments, at the user interface, gifting module 208 provides an input field or sliding bar, for example, with which a gift giver can select a value of each gift (or an amount including a price/value of a gift in addition to other costs associated with packing/shipping/delivery of the gift) to be included in a custom catalog of gifts for an intended gift recipient. In some embodiments, at the user interface, gifting module 208 can provide a series of questions, selections, sliding scales, options, and any other kind of interactive feature with which a gift giver can interact to provide useful information regarding an intended gift recipient and/or the occasion for the gift. In some embodiments, the information received from these interactive features is mapped to a set of characteristics regarding the intended gift recipient. In some embodiments, this set of characteristics and selected gift value are used to search for gifts (e.g., of the selected gift value that also match one or more of the set of characteristics) from gift inventory 206. In some embodiments, if the gift recipient has previously received a custom catalog (e.g., based on his or her gift recipient profile), then gifts that were previously included in a catalog for the gift recipient will not be included in the current catalog. The gifts found from gift inventory 206 are included in a preview of gifts, displayed at the user interface, and to be included in the custom catalog. In some embodiments, a gift giver can edit the gifts in the preview. For example, the gift giver can eliminate all gifts in the preview that are associated with a particular category. In some embodiments, subsequent to a gift giver's edits, gifting module 208 can search again for gifts from gift inventory 206 to replace those eliminated in the edits. In some embodiments, once the gift giver confirms that the gifts included in the preview are to be included in the custom catalog, then gifting module 208 stores the confirmed selection of gifts. In some embodiments, gifting module 208 can also provide the gift giver with options for customizing other aspects of the custom catalog. For example, gifting module 208 can present the gift giver with options to include a personalized greeting/message (e.g., "Happy 35$^{th}$ Birthday, Brian!"), a selection of graphics for the front and/or back covers of the catalog, a selection of font in which the text of the catalog is to be displayed, and a selection of a type of encasing (e.g., felt, leather) in which a physical version of the catalog is to be enclosed. In some embodiments, a finished custom catalog is stored with the confirmed selection of gifts and/or additional, if any, customized aspects of the catalog.

In some embodiments, gifting module 208 is configured to present a user interface to a gift recipient who wishes to redeem a gift from a received custom catalog of gifts. In some embodiments, the gift recipient can use an identifier found in the catalog to access an instance of the user interface that is tailored for the gift recipient. For example, the accessed user interface can display all the gifts included in the custom catalog received by the gift recipient. In some embodiments, the gift recipient can edit the selection of gifts. For example, in the event that the gift recipient does not prefer any of the gifts of the selection, the gift recipient can select an option to input more information about himself or herself. In some embodiments, the input information can be mapped to one or more characteristics. Then, gifting module 208 can search again for gifts from gift inventory 206 to find one or more gifts that match the gift value (e.g., as selected by the gift giver) and also the set of characteristics including the one or more characteristics received from the gift recipient. These gifts can be displayed in addition or in replacement of the original selection of gifts of the custom catalog. In some embodiments, the gift recipient can make a selection of one of the displayed gifts. In some embodiments, gifting module 208 receives an indication of the selected gift and checks gift inventory 206 for whether the gift is currently available. In some embodiments, gifting module 208 initiates a process to deliver the gift to the gift recipient. For example, gifting module 208 can contact a supplier or retailer (e.g., which has a partnership with the party supporting the gift catalog server) to ship the gift to the address of the gift recipient. By permitting the gift recipient to select among multiple choices of gifts and also the option to submit more information to receive more options of gifts, the gift recipient is likely to receive a gift with which he or she is content.

In some embodiments, gifting module 208 learns and adapts to actual selections made by gift recipients from generated custom gift catalogs. Based on the patterns of gift selection by one or more gift recipients from their respective custom catalogs, gifting module 208 can determine which gifts to include in future custom catalogs. For example, gifting module 208 can analyze all gift recipients associated with one or more particular characteristics (e.g., age and gender) and compile statistics on the types (e.g., categories) of gifts that are often chosen or not chosen by that group. Then, in the future, gifting module 208 can determine whether to include more or fewer of those types of gifts for gift recipients of those characteristics (e.g., as indicated on their corresponding gift recipient profiles) using the compiled data. For example, assume that gift recipients who are associated with the male gender and are in the 40 to 50 age range rarely ever, historically, select gift items from the cigar category. Because gifting module 208 could identify that this group has this preference (or rather, lack of preference), gifting module 208 may determine to no longer include gift items from the cigar category in subsequent custom catalogs for gift recipients that belong to this group. In another example, gifting module 208 can analyze gift selection patterns for a particular gift recipient and determine whether to include gifts of certain types for this gift recipient based on the analysis. For example, for a gift recipient that is offered gift items of a cologne category multiple times but never selects a gift from that category, gifting module 208 may not include gift items of the cologne category in a subsequent custom catalog for that gift recipient (even if the gift giver indicates that the gift recipient would like to receive cologne-types of gifts).

In some embodiments, gifting module 208 learns and adapts to a gift recipient user's gift purchase behavior and reminds the user to reciprocate when it may be appropriate. For example, gifting module 208 can keep track of a gift giving/gift purchasing pattern between a gift giver and a gift recipient. For example, if gifting module 208 determines that a gift recipient had received a custom gift catalog from a gift giver for the gift recipient's birthday, then when the gift giver's birthday draws near, the gift recipient could be prompted with the option to create a custom gift catalog for the gift giver. An example of a message included in such a prompt could be, "Brian bought you a birthday gift on Wantful. His birthday is in two weeks. Would you like to return the favor?". In some embodiments, gifting module 208 learns and adapts to a gift giver user's gift giving behavior and reminds the gift giver user to repeat a gift giving when it may be appropriate. For example, for a recurring event for which a gift giver has created a custom gift catalog for a particular gift recipient, gifting module 208 could prompt the gift giver with the option to create another custom gift catalog upon a subsequent recurrence of the event. An example of a message included in such a prompt could be, "You bought your mom a Mother's Day gift on Wantful last year. Do you want to create another one this year?"

In some embodiments, gifting module 208 communicates to one or more third party services (not shown). For example, gifting module 208 can communicate to a third party service associated with performing authentication (e.g., for either or both of a gift giver or gift recipient during sign-on of the custom catalog service), performing financial transactions (e.g., for contacting a financial service provider such as a credit card service when a charge is made), a social network (e.g., Facebook), and a gift supplier (e.g., to check for the availability of a gift when either or both when it is selected to be in a catalog and to be redeemed by a gift recipient). In some embodiments, gifting module 208 communicates to a third party service by interacting with a proprietary Application Programming Interface (API) associated with the third party service.

Figure 3:
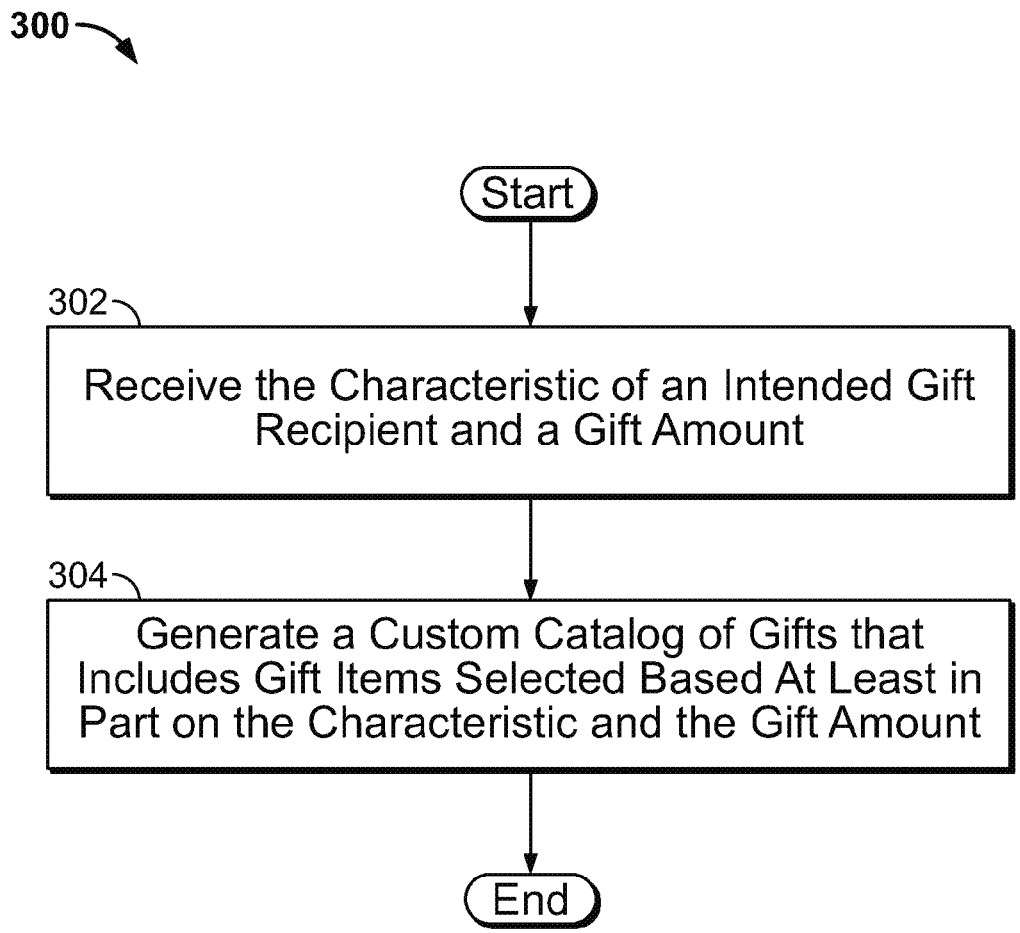
FIG. 3 is a flow diagram showing a process of giving gifts.

FIG. 3 is a flow diagram showing a process of giving gifts. In some embodiments, process 300 can be implemented using system 200.

At 302, a characteristic of an intended gift recipient and a gift amount are received. In some embodiments, one or more characteristics and the gift amount are received at a user interface associated with a service for creating custom catalogs of gifts. For example, a gift giver can provide various pieces of information regarding the intended gift recipient at the user interface and also a gift amount (that the gift giver is to pay to the service). In some embodiments, the gift amount or a consideration for the gift is paid by the gift giver at the time of creating the custom catalog of gifts (rather than at or subsequent to the time of gift redemption by the gift recipient).

At 304, a custom catalog of gifts that include gift items based at least in part on the characteristic and the gift amount is generated. In some embodiments, the received one or more characteristics and gift amount are used to search for gifts (e.g., from an inventory of gifts) to be included in a custom catalog of gifts. For example, gifts (and/or their associated metadata) of the inventory can be searched to find those that are both of the gift amount and match the one or more characteristics.

Figure 4:
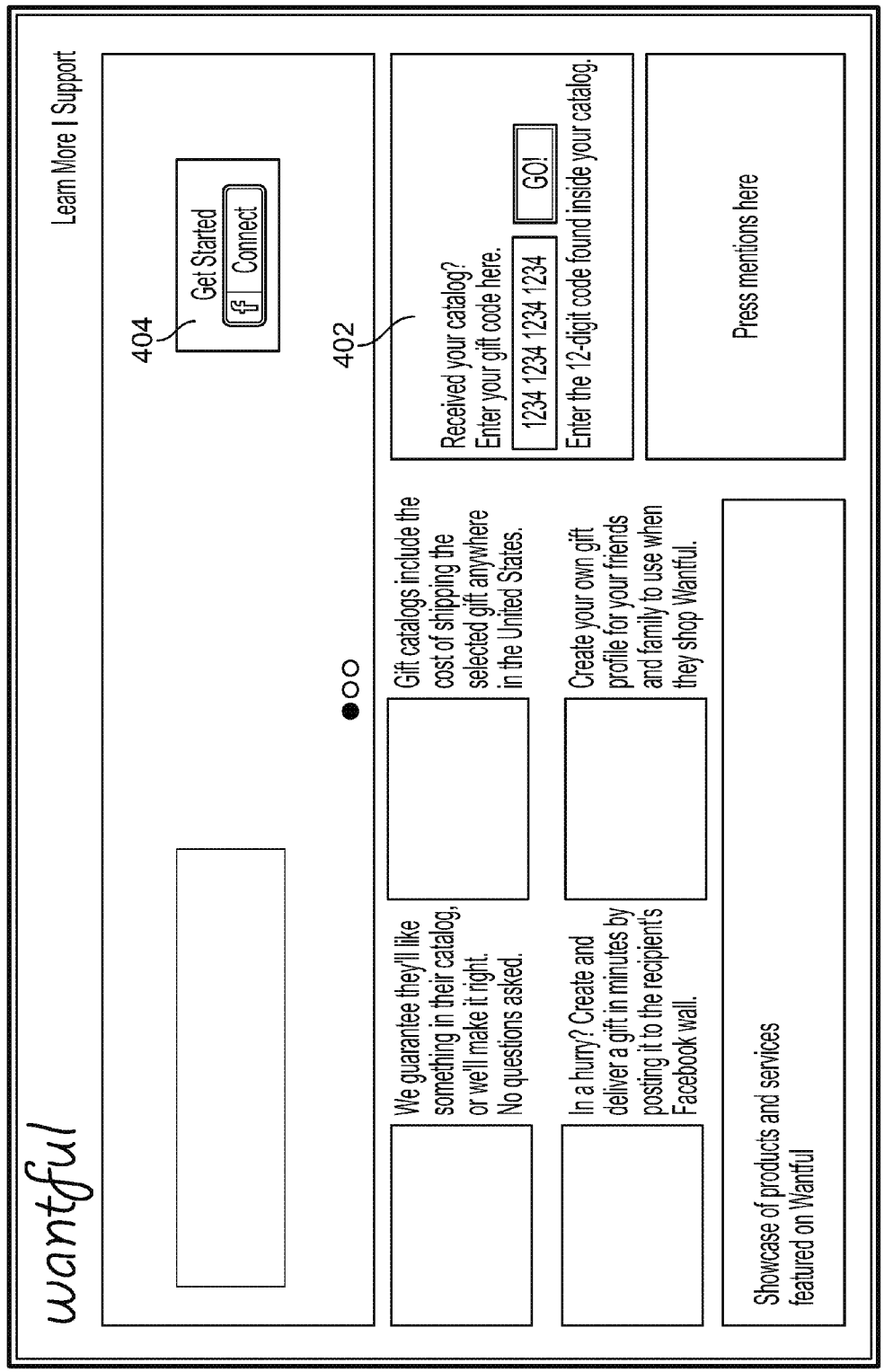
FIG. 4 is a diagram showing an example of a user interface associated with a service for creating custom catalogs of gifts in accordance with some embodiments.
Figure 5A:
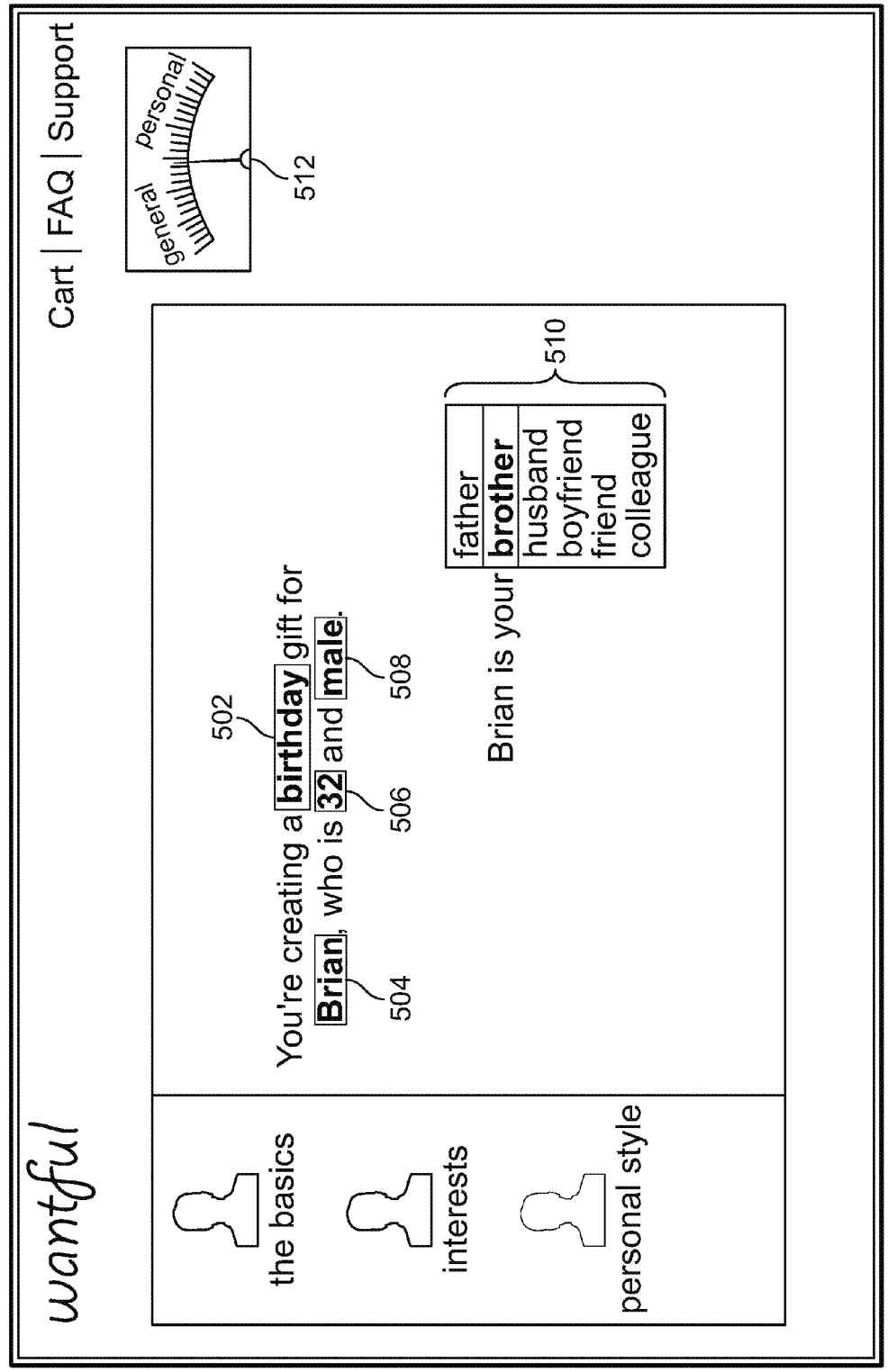
FIGS. 5A to 5D are diagrams showing examples of interactive features at a user interface associated with collecting information regarding an intended gift recipient in accordance with some embodiments.
Figure 5B:
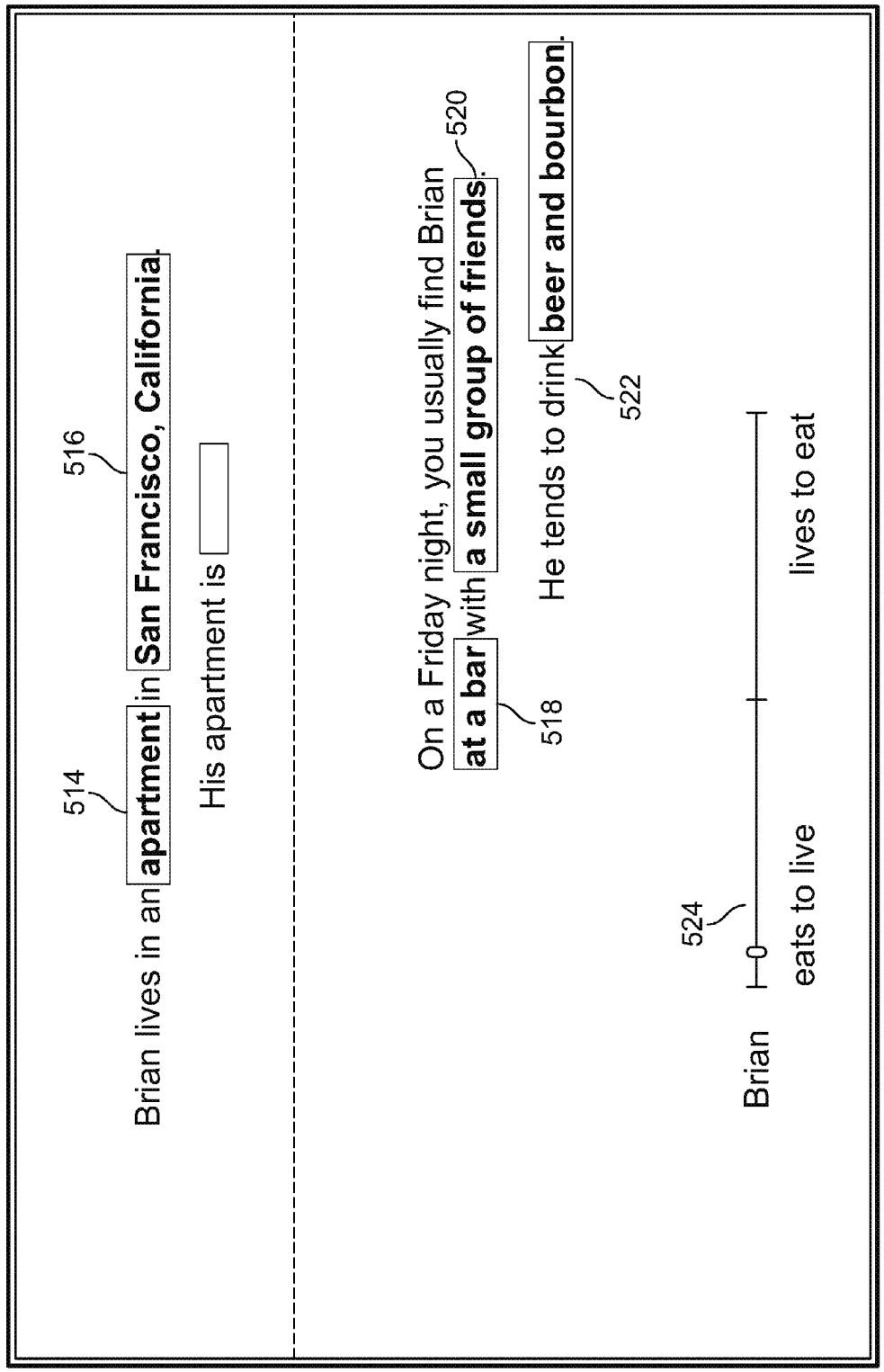
Figure 5C:
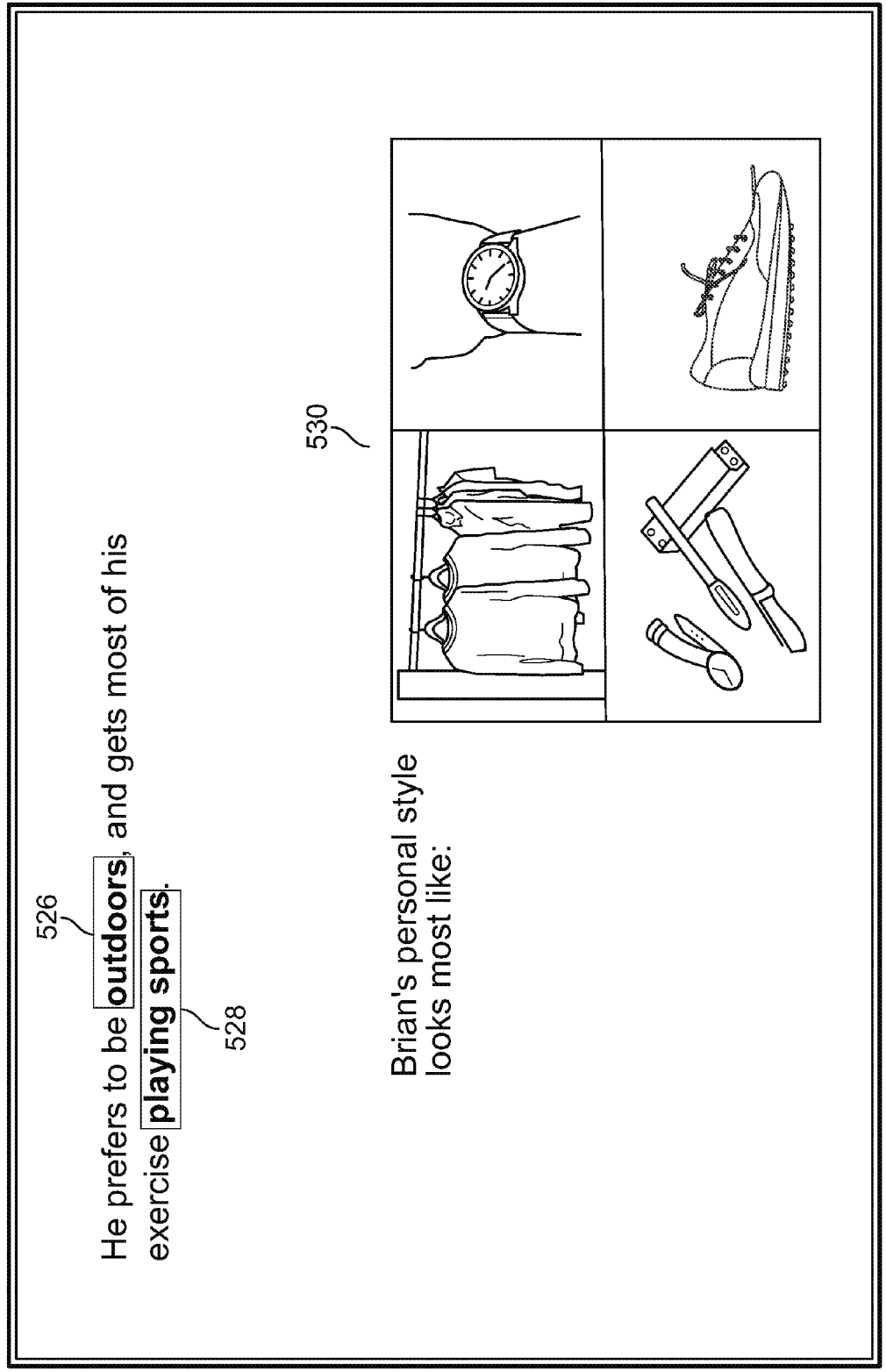
Figure 5D:
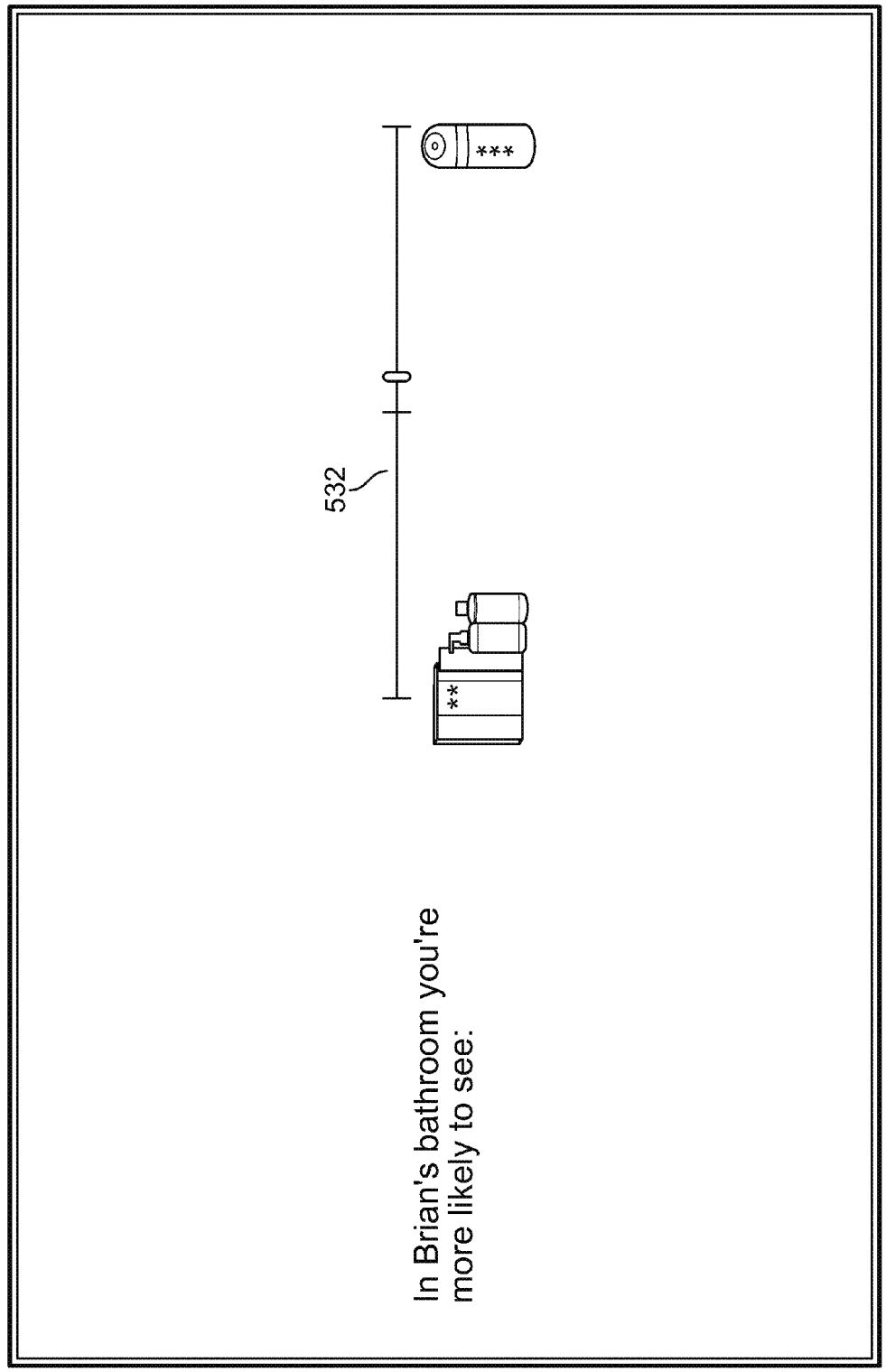
Figure 6:
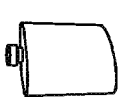
FIG. 6 is a diagram showing an example of a user interface with a preview display of gifts to be included in the custom catalog.

FIGS. 4 to 6 are examples of user interfaces associated with using the custom catalog of gifts service. The interactive features and/or questions shown in FIGS. 4 to 6 are examples and the features of the user interfaces are not limited to only those shown.

FIG. 4 is a diagram showing an example of a user interface associated with a service for creating custom catalogs of gifts in accordance with some embodiments. In some embodiments, the example of FIG. 4 is the home page (e.g., as displayed inside a web browser) of the service when a user (e.g., a gift giver and/or a gift recipient) accesses the URL associated with the service (e.g., "www.wantful.com"). In some embodiments, a gift giver who wishes to create a custom catalog of gifts for a gift recipient can create an account with the service at the home page. In the example shown, section 404 is one method by which a user can create an account with the service; the user can also use information associated with his account at a third party social network (e.g., Facebook). In some embodiments, a gift recipient who receives a custom catalog of gifts from the service can redeem a gift from the catalog by accessing the home page. In some embodiments, the catalog can include an (e.g., alphanumeric) identifier (e.g., a "gift code") that the gift recipient may enter at the home page to begin redeeming of a gift. In the example shown, section 402 includes an input field in which a gift recipient can enter a gift code found inside/with a received catalog of gifts to redeem a gift associated with that catalog.

FIGS. 5A to 5D are diagrams showing examples of interactive features at a user interface associated with collecting information regarding an intended gift recipient in accordance with some embodiments. In some embodiments, the information collected using the interfaces of FIGS. 5A to 5D includes predefined characteristics and/or information that can be mapped to a set of predefined characteristics.

The example of FIG. 5A shows an instance of a user interface that is used to collect basic information (e.g., from a user who is a gift giver) regarding an intended gift recipient. In some embodiments, the example of FIG. 5A is shown in response to a user signing into an account at the home page and then selecting to create a custom catalog of gifts. As shown in the example, 502 is an area in which a gift giver can input the occasion of the gift; 504 is an area for entering the name of the intended gift recipient; 506 is an area for entering the age of the gift recipient; 508 is an area for entering the gender of the gift recipient; and 510 is an area of entering/selecting the relationship of the gift recipient to the gift giver. In some embodiments, 502 to 510 are populated with values entered or selected or otherwise inputted at a different screen (or portion of the user interface). 512 is a meter for indicating a degree of personalization associated with the gift. In the example shown, a gifting module can determine, based on the nature and depth of information regarding the gift recipient that the gift giver has provided so far, how personalized the gift items will be that are to be included in the custom catalog. In some embodiments, the user interface dynamically responds to selections such that the selected degree of personalization in meter 512 moves from the "general" to "personal" section depending on the answers to questions and/or other responses to interactive features made by the gift giver. For example, the more interactive features that the gift giver prefers to interact with, the more likely that meter 512 will move from the "general" to the "personal" end. A gift giver could use meter 512 as a visual indication to know how much more time s/he should invest in providing information about the gift recipient through questions, such as 502 through 510, to ensure a better fit between the catalog and the gift recipient's interests.

In some embodiments, FIG. 5B is a continuation of the user interface shown in FIG. 5A. As shown in the example, a gift giver user can provide information regarding the living arrangement of the gift recipient in input areas 514 (e.g., type of housing) and 516 (e.g., city and state). For example, information regarding what type of housing in area 514 of the gift recipient can be associated with a helpful characteristic in matching gifts that are better suited to the space of an apartment rather than the (likely) comparatively larger space of a house. Also for example, information regarding city and state in area 516 in which the gift recipient lives can be helpful in determining whether certain gifts are permitted to be shipped or delivered to the gift recipient. For instance, alcohols cannot be shipped to certain states. Thus, in some embodiments, knowing the area in which the gift recipient lives may help narrow down the selection of gifts to be included in a catalog for the gift recipient.

As shown in the example, a gift giver user can provide information regarding habits of the gift recipient in input areas 518 (e.g., an activity in which the gift recipient participates) and 520 (e.g., the gift recipient's preferred size of company). In some embodiments and as shown in this example, in response to the giver user selecting the activity of going to a bar at area 518, the user interface has presented input area 522, which further inquires about the type(s) of alcohol that the gift recipient prefers (e.g., based on the assumption that the gift recipient drinks alcohol because he frequents bars). 524 is a sliding scale in which a gift giver user can use to indicate the degree of the gift recipient's interest in food/gastronomy. For example, a selection that the gift recipient has a low or no interest in food/gastronomy (e.g., "eats to live") could rule out one or more categories of gifts (e.g., of the gift inventory) that are related to eating, cooking, and food/gastronomy.

In some embodiments, FIG. 5C is a continuation of the user interface shown in FIGS. 5A and 5B. As shown in the example, a gift giver user can provide information regarding hobbies of the gift recipient in input areas 526 (e.g., a preferred location of the gift recipient) and 528 (e.g., a preferred activity at the preferred location). Area 530 offers a selection of four visual options with regard to the gift recipient's sense of dress style.

In some embodiments, FIG. 5D is a continuation of the user interface shown in FIGS. 5A, 5B and 5C. 532 is a sliding scale with which a gift giver user can use to indicate the gift recipient's preference in hygiene products. An advantage in using a variety of interactive features (e.g., sliding scales, meters, input areas, and pictures) is that the interactive feature that best fits a particular inquiry may be presented for that particular selection while another type of interactive feature may be presented for another inquiry. For example, a selection of pictures may be best suited for a gift giver to identify a dress style of the gift recipient whereas a selection of pictures may not be as helpful for identifying where the gift recipient lives.

FIG. 6 is a diagram showing an example of a user interface with a preview display of gifts to be included in the custom catalog. In some embodiments, the example of FIG. 6 is presented in response to the completion of one or more inquiries regarding the gift recipient (e.g., the interactive features of FIGS. 5A, 5B, 5C, and 5D). In the example shown, at area 618, the gift value can be selected from a list of enumerated values/amounts (e.g., $30, $50, $100, $250, $500, and $1000). In some embodiments, the gift value/amount can be any number the gift giver user enters (e.g., in an input area). In some embodiments, the gift value/amount can be in credits (e.g., Facebook credits) associated with a service (e.g., Facebook) rather than a specific currency (e.g., United States Dollars). In some embodiments, gifts included in the preview display are associated with values that are either the exact value of the selected gift value or within a tolerance (e.g., +/−$5) from the gift value. Categories 604, 606, 608, 610 and 612 are all categories of gifts in which each gift matches the selected gift value and the characteristics of the gift recipient as provided (e.g., by a gift giver user) to the user interface. In some embodiments, matched gifts are sorted by the category included in the gift's associated metadata. In some embodiments, each category includes the same number of gifts (e.g., 5 gifts). In the example shown, category 612 ("Pay it forward") includes gifts that are donations to various charities. In the example shown, the associated checkbox 614 of category 608 ("Home and garden") is unchecked and so all the gifts of that category are eliminated (e.g., will not be present in the custom catalog). In some embodiments, in response to eliminating a category of gifts, the user interface may search for more gifts (e.g., of the selected gift value and that match the set of characteristics) of a different category to replace that category. In the example shown, 602 can be selected to refine the information provided with respect to the intended gift recipient (e.g., "Refine Brian's profile for more"). In some embodiments, by selecting 602, the user interface may present some of the same and/or additional inquiries to receive more information (e.g., more characteristics) to use in finding suitable gifts (e.g., from the gift inventory).

In the example shown, in section 616, the user interface presents additional aspects of the custom catalog for which a gift giver user may customize. For "Style," a different style may be selected to influence one or more of the following: front and back cover art, font, and graphics. For "Cover message," a personalized message may be entered. For "Delivery," a form of delivery of the custom catalog of gifts to the gift recipient may be selected, at various associated costs (e.g., shipping costs). For "Present it with style," assuming that a physical, printed version of the catalog is to be made to give to the gift recipient, a particular style of encasing (e.g., felt sleeve) may be selected to enclose the catalog. In some embodiments, a gift giver pays the gift value and any additional charges (e.g., shipping cost) at the completion of creating a custom catalog of gifts, rather than at the time of or after the redemption of the gift by the gift recipient. In some embodiments, the selected gift value/amount includes the costs of packaging/shipping/delivery in addition to a price/value of each gift to be included in the custom catalog.

Figure 7:
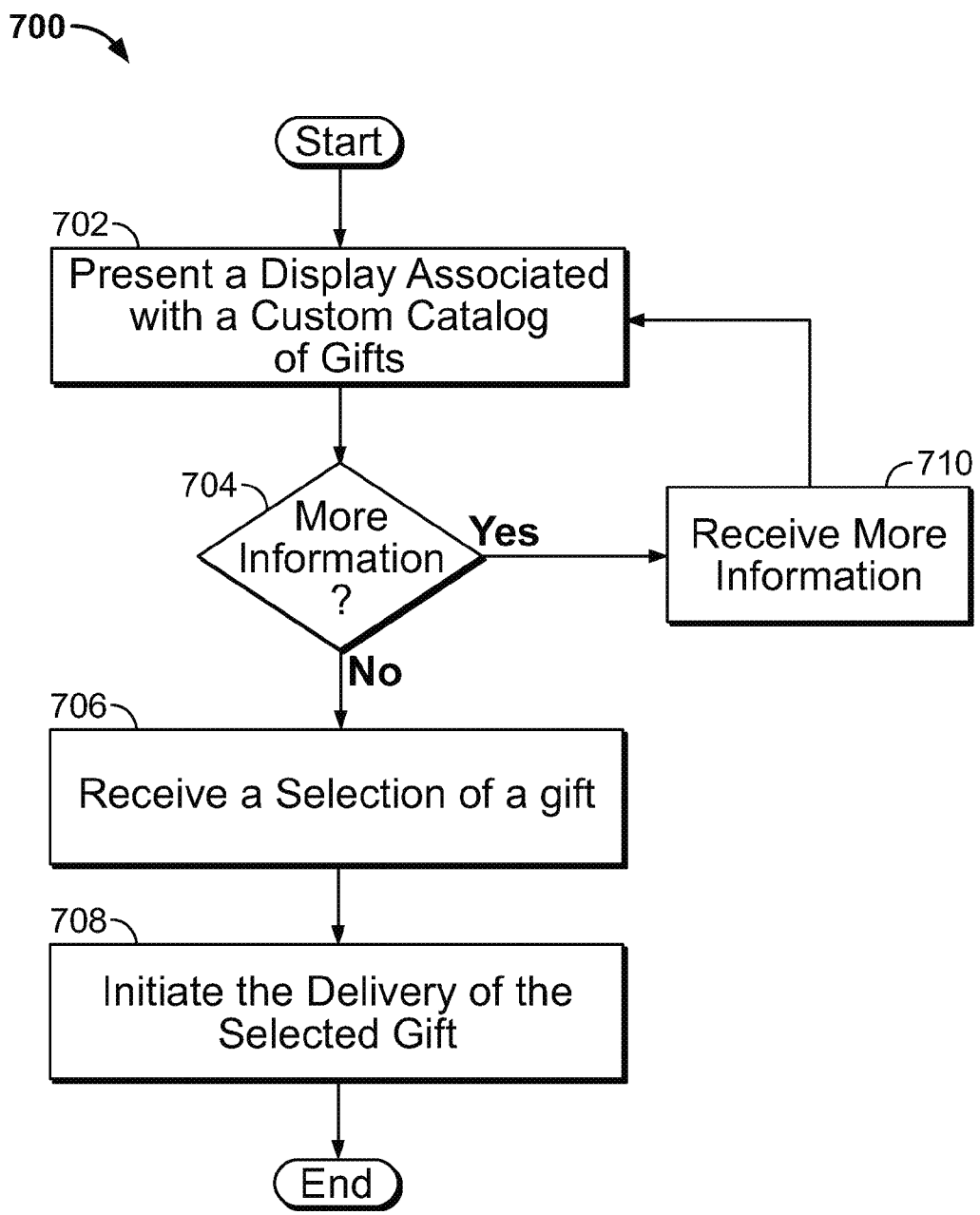
FIG. 7 is a flow diagram showing an embodiment of fulfilling a delivery associated with a custom catalog of gifts.

FIG. 7 is a flow diagram showing an embodiment of fulfilling a delivery associated with a custom catalog of gifts. In some embodiments, process 700 can be implemented using system 100.

At 702, a display associated with a custom catalog of gifts is presented. In some embodiments, a gift recipient receives a physical, printed version of a custom catalog of gifts. For example, the printed version of the catalog can include a gift code (e.g., a unique alphanumeric string) that is printed inside the catalog. The gift recipient can then access the user interface associated with the custom catalog of gifts creation service (e.g., using a web browser or software application on a device) and enter the gift code at the appropriate input area. By doing so, the gift recipient will be linked to an instance of the user interface that is tailored for the gift recipient with respect to this received custom catalog. In this example, the user interface can display visual representations of all the gifts inside the custom catalog, among other things. In some embodiments, a visual representation of a gift includes at least one image and/or a textual description of the gift.

In some embodiments, the gift recipient receives an electronic notification regarding the reception of the custom catalog. For example, the gift recipient can receive an email including a hyperlink and/or a gift code to access an instance of the user interface that is tailored for the gift recipient with respect to this received custom catalog. In another example, the gift recipient can receive an alert associated with a social network (e.g., Facebook) that informs the gift recipient of a hyperlink and/or a gift code to access the specially tailored instance of the user interface.

At 704, it is determined whether more information is needed. In some embodiments, once the gift recipient accesses the user interface (e.g., using a hyperlink or gift code associated with the custom catalog), the gift recipient can see visual representations (e.g., in the form of text and/or graphics) of all the gifts included in the custom catalog. In some embodiments, if the gift recipient does not wish to select any of the displayed gifts, the gift recipient can provide more information about himself or herself and control passes to 710. For example, if the gift recipient does not prefer any of the gifts currently in the catalog, the gift recipient can make a selection at the user interface associated with providing more information. The user interface can then display one or more interactive features (similar to the ones displayed for the gift giver in the process of creating a custom catalog) to receive information from the gift recipient about himself or herself. In some embodiments, the gift recipient's stored profile is updated to reflect any additional information provided by the gift recipient. In response to receiving more information, the service can search (e.g., the gift inventory) and return one or more new gifts (that match the newly provided information and also the gift value as paid for by the gift giver) that were not previously presented. The newly returned gifts are then presented in a display to the gift recipient at 702.

Otherwise, if the gift recipient does wish to select among one of the displayed gifts, then the user interface does not receive an indication to provide more information from the gift recipient and control passes to 706.

At 706, a selection of a gift is received. In some embodiments, a selection of a displayed gift in the user interface is selected. For example, the gift recipient can click on a visual representation of the gift to indicate his or her selection. In some embodiments, upon receiving a selection of a gift, an availability associated with the gift is checked (e.g., by the gift catalog server). For example, the gift inventory can be checked to determine whether the metadata associated with the gift indicates that the gift is in stock (e.g., there is at least one instance of the gift in stock at a retailer or supplier of the gift).

At 708, the delivery of the selected gift is initiated. In some embodiments, upon receiving a selection of a gift (and receiving an indication that the gift is available), a source of the gift (e.g., a retailer or supplier) is contacted (e.g., by the gift catalog server) with the appropriate information. For example, the appropriate information can include an identifier associated (e.g., name and/or product number) with the selected gift, the name and address of the gift recipient, and any packaging requests. In some embodiments, the gift is then delivered to the gift recipient via some form of delivery service (e.g., UPS, FedEx, USPS).

In some embodiments, the gift giver would have already paid for the gift value/amount at the creation of the custom catalog (i.e., prior to the process 700 of fulfilling a delivery of a gift). In various embodiments, the gift value/amount as paid for by the gift giver is predetermined to include the packaging/shipping/delivery cost and/or any other additional costs of any gift from the custom catalog, regardless of which gift is ultimately selected from the custom catalog and where it is shipped to. The actual cost of the gift plus packaging/shipping/delivery of the gift may cost the provider of the custom catalog of the gift server more or less than the gift value as paid by the gift giver, but for simplicity and certainty, the gift value is charged prior to the selection of a gift and the shipping of that gift to the gift recipient.

In some embodiments, upon selecting a gift, the user interface presents an option for the gift recipient to enter a message (e.g., a thank you note) to be delivered to the gift giver. In some embodiments, the user interface displays the birthday of the gift giver so that the gift recipient may be informed (e.g., in the event that the gift recipient would like to create a catalog for the gift giver to return the favor). In some embodiments, the gift recipient can create an occasion (and/or an associated reminder) using the presented information regarding the gift giver's birthday such that the gift recipient could be prompted to reciprocate a gift for that occasion.

Figure 8:
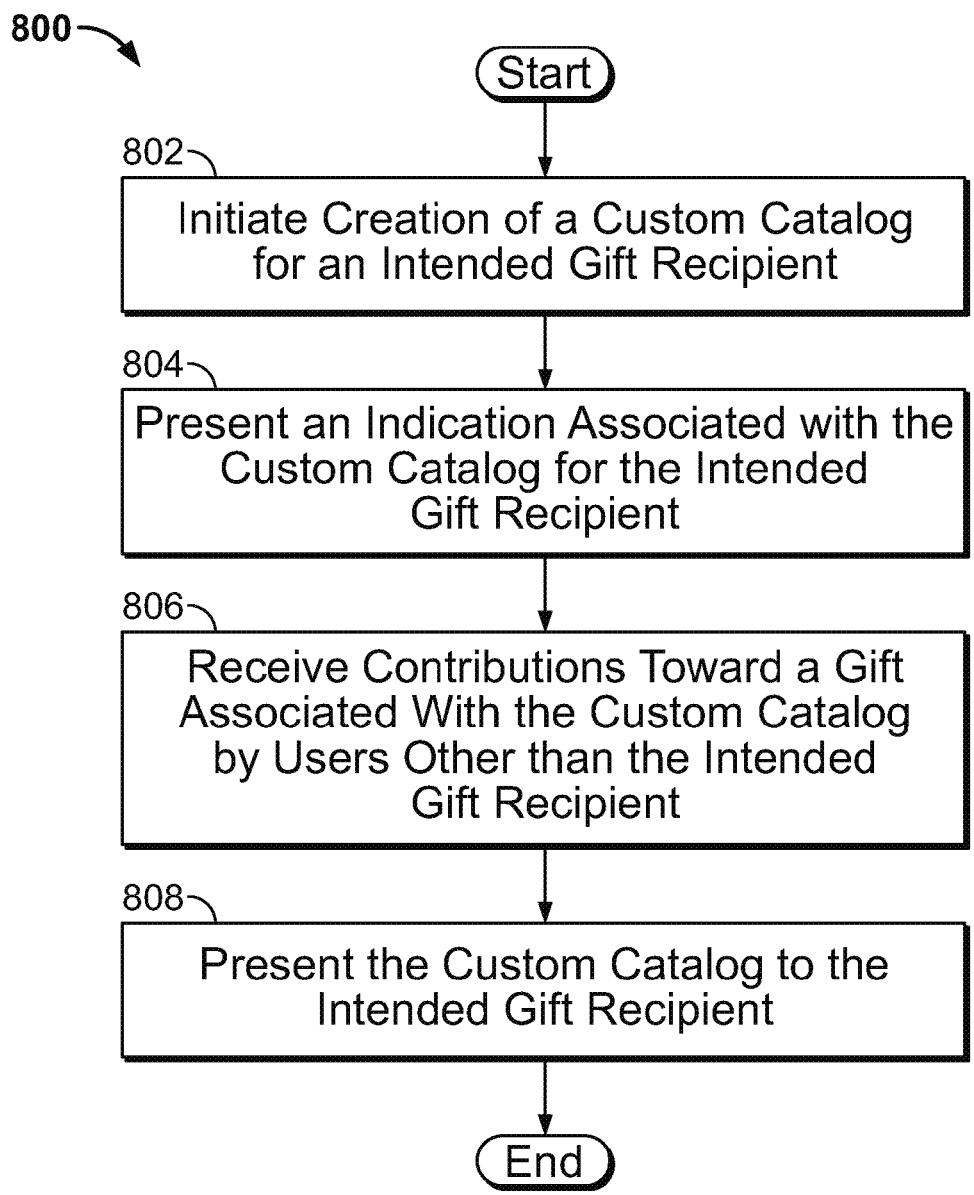
FIG. 8 is a flow diagram showing an embodiment of receiving contributions from a group towards a gift.

FIG. 8 is a flow diagram showing an embodiment of receiving contributions from a group towards a gift. In some embodiments, process 800 can be implemented using system 100.

In some embodiments, the catalog customizing service can be integrated with a third party service, such as that of an online social network or another social media tool. In some embodiments, the third party social network is Facebook. In some embodiments, the catalog customizing service can be integrated with the social network in the form of an application such that a user of the social network can have access to the catalog customizing service (e.g., by default or after creating an account with the service). In some embodiments, the social network includes a feature in which the date of a user's birthday is viewable to one or more other users (e.g., "friends" or any other kind of relationship that is recognized by the social network). Sometimes, the date of the user's birthday is viewable several days, weeks and even months in advance of the actual birthday. In some embodiments, the social network also includes a feature in which each user's profile includes an area (e.g., Facebook's "Wall") in which other users (with the appropriate permissions) can post text, graphics, hyperlinks, rich media, and an element associated with an application integrated into the social network, among others. By taking advantage of at least these two features of a social network, the gift giving experience using the custom catalog service can be expanded to include money contributions by multiple users of the social network towards a gift for a particular user of the social network.

At 802, creation of a custom catalog for an intended recipient is initiated. In some embodiments, a gift giver initiates creation of a custom catalog of gifts for a gift recipient (e.g., using process 300). In some embodiments, both the gift giver and the gift recipient are users (e.g., account holders) of a social network (e.g., Facebook). In some embodiments, displayed near or in association with a social network's user's birthday (as viewable to another user of the social network) is a selectable area configured to, once selected, take the other user to a user interface for creating a custom catalog of gifts for the user whose birthday is approaching. In some embodiments, the social network user who initiates the custom catalog can select a group giving option. In some embodiments, the user who initiated the catalog can also select a total and/or targeted gift value (e.g., in the user interface such as the example of FIG. 6) and also a portion of the selected gift value that he or she will contribute (e.g., pay to the service). In some embodiments, the user who initiated the catalog does not select a total gift value but only his or her contribution towards the total gift value. In some embodiments, once the group giving option is selected, other users of the social network may contribute towards the total gift value up until a cut off time (e.g., a minute before midnight of the birthday).

For example, user Alice sees on Facebook that her friend Brian's birthday is coming up in a few days. She would like to give him a gift by means of allowing him to select one he prefers from a catalog of gifts she designs. So Alice accesses the catalog customizing service through Facebook (e.g., by accessing the application integrated into Facebook). Alice follows through the process of interacting with the user interface to provide helpful information about Brian's preferences, hobbies, habits and personal style, among others. Alice also selects the group giving option at the user interface and a contribution of $20. Because the group giving feature is selected, Alice can choose to contribute only a portion (as opposed to the whole) of the gift value and allow others to contribute towards the overall gift value.

At 804, an indication associated with the custom catalog for the intended gift recipient is presented. In some embodiments, the social network user who initiated the creation of the catalog can post an element associated with the catalog customizing service at the profile of the gift recipient user. In various embodiments, the posted element is not viewable to the gift recipient user until a predetermined time (e.g., the day of his or her actual birthday) but is viewable to users other than the gift recipient user, such as to the gift recipient's "friends" or "followers" or some subset thereof.

Returning to the previous example, after completing the catalog, the user interface generates a special piece of code configured to be displayed at a Facebook Wall (or other social network equivalent) as a clickable element that, once clicked, permits users to contribute money towards the total gift value. Also, when the catalog is ready to be accessed by Brian, such as on the actual day of this birthday, the element permits the gift recipient user to access his custom catalog. Alice can cut and paste this piece of code to Brian's Facebook Wall. While this element is not viewable by Brian until the designated day that he may access the custom catalog, the element is viewable by others, such as users of Facebook who are friends with Brian on the social network. The element may include graphics and/or text such as, "Help contribute towards a gift for Brian! Eight of his friends have contributed a total of $160 so far." This way, once a friend of Brian's browses his Facebook profile, he can be alerted to the group gift that is underway and perhaps be inclined to contribute towards the group gift.

At 806, contributions toward a gift associated with the custom catalog by users other than the intended gift recipient are received. In some embodiments, one or more users at the social network can select the element at the gift recipient user's profile to indicate a contribution of money towards the total value of the gift. In some embodiments, the user who created the catalog can designate that all contributions toward the total gift value are of the same value denomination (e.g., each contribution by a user is $10). In some embodiments, a user can contribute any amount. In some embodiments, contributions are received until a cut off time (e.g., the minute before midnight of the birthday). In some embodiments, subsequent contributors are provided an option to answer questions about the recipient, to further build the gift recipient's profile and potentially further increase the likelihood that gifts of interest to the recipient will be included in the catalog.

Returning to the previous example, Colleen sees the group gift element (created by Alice) at Brian's Facebook Wall and also decides to contribute $20. Dan, Ernie, and Frank, also friends of Brian, do the same and each contributes $20 towards the value of the gift. By the cut off time, a total of 5 users of Facebook have contributed to Brian's gift for a total gift value of $100.

At 808, the custom catalog is presented to the intended gift recipient. In some embodiments, the custom catalog is created after the cut off time of contributions such that the gift value/amount (as determined by the total contributions at that time) will be known. In some embodiments, prior to the creation of the custom catalog, the user who initiated the creation of the group gift has the option to review, edit, and approve the custom catalog before it is created. In some embodiments, at the designated time (e.g., noon on the day of the gift recipient's birthday), the custom catalog is displayed for the intended gift recipient. In some embodiments, at the designated time, the gift recipient receives an electronic notification that a custom catalog has been created for him or her using a group gift feature. In some embodiments, the element associated with the group gift on the gift recipient's profile becomes a selectable area configured to, once selected, permit the gift recipient to access the custom catalog. The custom catalog includes gifts of the total gift value (i.e., each gift of the catalog is of the value of the total of all the user's contributions). In some embodiments, the gift recipient accesses the custom catalog and can redeem a gift from the catalog (e.g., using process 700).

Returning to the previous example, on the day of Brian's birthday, Brian checks his Facebook profile and sees that a group gift has been given to him by five of his friends (Alice, Colleen, Dan, Ernie and Frank). Brian clicks on the group gift element and is taken to a user interface that presents the custom catalog of gifts for him. The custom catalog includes several gift options, each valued at $100.

The disclosed gift giving techniques advantageously permit a gift giver to apply his or her knowledge of the gift recipient towards a gift, without needing to know precisely what to select for the recipient. Also, the gift recipient can choose from among a selection of gifts that is specially customized for him or her. Additionally, the gift recipient can provide more information about his or her preferences to receive more choices of a gift so as to have a greater chance of choosing a desired gift. The overall gift giving and gift receiving experience is thus facilitated for both the gift giver and gift recipient.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A method for gift giving, comprising:
   receiving, at a server via a gift giver user interface, one or more characteristics of an intended gift recipient and a gift amount, wherein the one or more characteristics are provided by a gift giver;
   in response to receipt of the one or more characteristics of the intended gift recipient, determining a degree of personalization associated with gifts to be included in a custom catalog of gifts for the intended gift recipient, wherein the degree of personalization is determined by the server based at least in part on the one or more characteristics;
   displaying at the gift giver user interface a visual indication associated with the degree of personalization, wherein the visual indication comprises a meter ranging from general to personal and an indicator placed along a position of the meter determined based at least in part on the degree of personalization;
   determining one or more gift items to be included in the custom catalog of gifts for the intended gift recipient based at least in part on the one or more characteristics, the gift amount, and the degree of personalization; and
   including information associated with at least a portion of the one or more gift items into the custom catalog of gifts.

2. The method of claim 1, wherein the one or more characteristics and the gift amount are received via the gift giver user interface.

3. The method of claim 1, wherein the gift amount comprises an amount the gift giver has indicated the gift giver will pay to give the gift.

4. The method of claim 1, wherein the one or more gift items include gifts the cost of which is less than or equal to the gift amount.

5. The method of claim 1, wherein a gift service provider agrees to provide to the intended gift recipient a selected gift item selected from the custom catalog of gifts by the intended gift recipient in exchange for receiving from the gift giver a payment or other consideration equal to the gift amount.

6. The method of claim 1, further comprising:
   displaying via the gift giver user interface one or more gift categories determined to be associated with the one or more characteristics;
   displaying a prompt to exclude a gift category of the one or more gift categories from the custom catalog of gifts; and
   receiving a selection associated with the prompt to exclude a selected gift category of the one or more gift categories from the custom catalog of gifts.

7. The method of claim 1, further comprising prompting the gift giver to provide more information regarding the intended gift recipient.

8. The method of claim 1, wherein determining the one or more gift items includes comparing the one or more characteristics to metadata associated with gifts of a gift inventory.

9. The method of claim 1, further comprising:
   publishing the custom catalog of gifts; and
   delivering the custom catalog of gifts to the intended gift recipient.

10. The method of claim 1, further comprising receiving a selection associated with the custom catalog of gifts.

11. The method of claim 10, further comprising delivering a gift of the custom catalog of gifts associated with the selection.

12. The method of claim 1, further comprising providing a group gift to the intended gift recipient including:
   displaying at the gift giver user interface a prompt associated with initiating the group gift for the gift recipient;
   receiving a selection associated with the prompt associated with initiating the group gift from a first user;
   receiving a first contribution amount comprising a first portion towards the gift amount from the first user; and
   receiving a second contribution amount comprising a second portion towards the gift amount from a second user.

13. The method of claim 12, further comprising receiving one or more additional characteristics of the intended gift recipient from the first user.

14. The method of claim 12, wherein the prompt associated with initiating the group gift for the gift recipient is displayed at a user interface associated with a social network.

15. A system for gift giving, comprising:
   a processor configured to:
      receive, at a server via a gift giver user interface, one or more characteristics of an intended gift recipient and a gift amount, wherein the one or more characteristics are provided by a gift giver;
      in response to receipt of the one or more characteristics of the intended gift recipient, determine a degree of personalization associated with gifts to be included in a custom catalog of gifts for the intended gift recipient, wherein the degree of personalization is determined by the server based at least in part on the one or more characteristics;
      display at the gift giver user interface a visual indication associated with the degree of personalization, wherein the visual indication comprises a meter ranging from general to personal and an indicator placed along a position of the meter determined based at least in part on the degree of personalization;
      determine one or more gift items to be included in the custom catalog of gifts for the intended gift recipient based at least in part on the one or more characteristics, the gift amount, and the degree of personalization; and
      include information associated with at least a portion of the one or more gift items into the custom catalog of gifts; and
   a memory coupled to the processor and configured to provide the processor with instructions.

16. The system of claim 15, wherein the one or more characteristics and the gift amount are received via the gift giver user interface.

17. The system of claim 15, wherein a gift service provider agrees to provide to the intended gift recipient a selected gift item selected from the custom catalog of gifts by the intended gift recipient in exchange for receiving from the gift giver a payment or other consideration equal to the gift amount.

18. The system of claim 15, wherein the processor is further configured to:

display via the gift giver user interface one or more gift categories determined to be associated with the one or more characteristics;
display a prompt to exclude a gift category of the one or more gift categories from the custom catalog of gifts; and
receive a selection associated with the prompt to exclude a selected gift category of the one or more gift categories from the custom catalog of gifts.

19. The system of claim 15, wherein the processor is further configured to prompt the gift giver to provide more information regarding the intended gift recipient.

20. The system of claim 15, wherein the processor is further configured to provide a group gift to the intended gift recipient:
display at the gift giver user interface a prompt associated with initiating the group gift for the gift recipient;
receive a selection associated with the prompt associated with initiating the group gift from a first user;
receive a first contribution amount comprising a first portion towards the gift amount from the first user; and
receive a second contribution amount comprising a second portion towards the gift amount from a second user.

21. The system of claim 20, wherein the processor is further configured to receive one or more additional characteristics of the intended gift recipient from the first user.

22. The system of claim 20, wherein the prompt associated with initiating the group gift for the gift recipient is displayed at a user interface associated with a social network.

23. A computer program product for gift giving, the computer program product being embodied in a non-transitory computer readable medium and comprising computer instructions for:
receiving, at a server via a gift giver user interface, one or more characteristics of an intended gift recipient and a gift amount, wherein the one or more characteristics are provided by a gift giver;
in response to receipt of the one or more characteristics of the intended gift recipient, determining a degree of personalization associated with gifts to be included in a custom catalog of gifts for the intended gift recipient, wherein the degree of personalization is determined by the server based at least in part on the one or more characteristics;
displaying at the gift giver user interface a visual indication associated with the degree of personalization, wherein the visual indication comprises a meter ranging from general to personal and an indicator placed along a position of the meter determined based at least in part on the degree of personalization;
determining one or more gift items to be included in the custom catalog of gifts for the intended gift recipient based at least in part on the one or more characteristics, the gift amount, and the degree of personalization; and
including information associated with at least a portion of the one or more gift items into the custom catalog of gifts.

* * * * *